United States Patent [19]

Derichs et al.

[11] Patent Number: 4,915,212

[45] Date of Patent: Apr. 10, 1990

[54] APPARATUS FOR TRANSPORTING COPS AND COP TUBES

[75] Inventors: Josef Derichs, Mönchengladbach; Heinz Kamp, Wegberg, both of Fed. Rep. of Germany

[73] Assignee: W. Schlafhorst & Co., Mönchengladbach, Fed. Rep. of Germany

[21] Appl. No.: 238,914

[22] Filed: Aug. 31, 1988

[30] Foreign Application Priority Data

Sep. 1, 1987 [DE] Fed. Rep. of Germany ....... 3729130

[51] Int. Cl.$^4$ .............................................. B64H 67/06
[52] U.S. Cl. ................................ 198/803.01; 198/367; 198/465.2; 57/281; 242/35.5 A
[58] Field of Search .................. 198/367, 465.1, 465.2, 198/465.3, 803.01; 57/281; 242/35.5 A

[56] References Cited

U.S. PATENT DOCUMENTS 4,694,949 9/1987 Nakagawa .................... 198/465.1 X
4,776,468 10/1988 Kiriake ........................ 242/35.5 A X

FOREIGN PATENT DOCUMENTS 3344473 6/1984 Fed. Rep. of Germany .
3544560 7/1986 Fed. Rep. of Germany .
3616880 11/1986 Fed. Rep. of Germany .
1113839 5/1986 Japan .............................. 242/35.5 A Primary Examiner—Robert J. Spar
Assistant Examiner—Lyle Kimms
Attorney, Agent, or Firm—Herbert L. Lerner; Laurence A. Greenberg

[57] ABSTRACT

An apparatus for transporting cops and cop tubes includes a plurality of circular-disk-type carriers having two opposite sides. Spindle bearings each have a bearing portion penetrating and protruding beyond a respective one of the carriers toward one of the opposite sides of a respective one of the carriers. Spool spindles each are rotatably supported in and protrude beyond a respective one of the bearings toward another of the opposite sides of a respective one of the carriers for carrying a cop or a tube. The carriers have substantially planar lower surfaces each surrounding a respective one of the protruding bearing portions. A transport apparatus movable in a given transport direction has a surface operatively connected to one of the opposite sides of each of the carriers. Another of the opposite sides of each of the carriers is slidingly guided in a guide rail.

14 Claims, 5 Drawing Sheets

APPARATUS FOR TRANSPORTING COPS AND COP TUBES

SPECIFICATION

The invention relates to an apparatus for transporting cops and cop tubes, including a plurality of circular-disk-type carriers each having one spool spindle which supports one cop or tube and which is rotatably supported in a bearing.

It is already known to slip cops of a spinning machine onto transport elements and then to deliver them by means of a transport system to a spooling machine where they are inserted at empty unwinding locations in the spooling machine. After the cop has been unwound, the transport element with the empty tube is moved out of the spooling machine and returned by the transport system to the spinning machine. There, the empty tube is placed on a spindle at an empty spinning station, and newly spun yarn is wound onto it to form a new cop.

In German Published, Non-Prosecuted Application DE-OS 35 44 560, corresponding to U.S. Pat. No. 4,667,807, a cop holder spindle is rotatably supported in a transport element, in order to enable easy rotation of the cop to find the end of the yarn.

In order to transport the spinning spools or tubes, the tubes are first lifted from the spindle at the spinning station and placed on a carrier. At the spooling machine the spinning spools are in turn lifted from the carriers and inserted at the appropriate spooling station. The process is similar with the empty tubes, which are placed on the carrier from the spooling machine and must be lifted from the carriers again at the spinning machine. In order to provide circulation between the spinning machine and the spooling machine, transfer apparatus and suitable handling and control technology are required, which makes the transport quite expensive.

German Published, Non-Prosecuted Application DE-OS 36 16 880, corresponding to U.S. Pat. No. 4,683,713, discloses conveyor tracks for both spinning spools and empty spools which connect spinning machines to spooling machines. However, these configurations do not allow the transport of spinning spools or tubes on a carrier with spindle bearing means having a bearing portion that penetrates and protrudes beyond the carrier toward the side opposite the spindle.

It is accordingly an object of the invention to provide an apparatus for transporting cops or tubes, which overcomes the hereinafore-mentioned disadvantages of the heretoforeknown devices of this general type and with which tubes and cops that are ready for unwinding can be transported gently, quickly and reliably in an upright position between spinning machines and spooling machines.

With the foregoing and other objects in view there is provided, in accordance with the invention, an apparatus for transporting cops and cop tubes, comprising a plurality of circular-disk-type carriers having two opposite sides, spindle bearings each having a bearing portion penetrating and protruding beyond a respective one of the carriers toward one of the opposite sides of a respective one of the carriers, spool spindles each being rotatably supported in and protruding beyond a respective one of the bearings toward another of the opposite sides of a respective one of the carriers for carrying a cop or a tube, the carriers having substantially planar lower surfaces each surrounding a respective one of the protruding bearing portions, a transport apparatus movable in a given transport direction having a surface operatively connected to one of the opposite sides of each of the carriers, and a guide rail in which another of the opposite sides of each of the carriers is slidingly guided.

According to the invention, the apparatus for transport of the cops or tubes placed on spindles has a very simple structure. The spindle carrier is in operative connection with the transport apparatus on one side, while on the other side it rests on a sliding surface. Since the carrier is disposed at the level of the upper end of the bearing tube of the spindle bearing, and the spindle bearing protrudes downward into the free space between the guide rail and the transport apparatus, it is possible to advantageously locate the center of gravity of the spindle so low that it cannot tip over on the transport system. A drive element can also engage the spindle, so that the unwound empty tube can be moved with its carrier into the spinning position. Transfer of the tube is unecessary. The same is true for the full cop, which can be moved from the spinning position, along with the carrier, directly to a free spooling station.

The taking along or slaving of the carrier by the transport apparatus is carried out by means of friction locking. However, other slaving devices are also conceivable, such as slaving by a drag chain.

In accordance with another feature of the invention, the transport apparatus is in the from of a configuration of driven rollers.

In accordance with a further feature of the invention, the transport apparatus is in the form of a traction mechanism drive.

The carriers are constructed similarly to circular disks. The transport apparatus may advantageously be in frictional contact with the carrier from beneath it or from the side.

A lateral drive of the carriers enables a deviation of the feed path from a straight line in the direction toward the transport mechanism. This enables the carriers to travel around curves or even in a closed travel loop, by means of suitable guidance.

The guide rail has a C-shaped profile, which overlaps the carrier at the top and bottom.

In accordance with an added feature of the invention, the guide rail is a first guide rail, and there is provided a second guide rail guiding the carriers and being disposed opposite the first guide rail, the transport apparatus being disposed in the second guide rail.

In accordance with an additional feature of the invention, the transport apparatus includes a flat-belt-type traction mechanism sliding on the second guide rail between the second guide rail and the lower surfaces of the carriers.

The second guide rail may advantageously have a C-shaped profile as well, which overlaps both the carrier and the traction mechanism. This makes tipping over of the spindles impossible.

In accordance with yet another feature of the invention, the transport apparatus has a flat-belt, toothed-belt or V-belt-type traction mechanism with traction runs, one of the traction runs laterally contacting and carrying along the circular-disk-type carriers.

In accordance with yet a further feature of the invention, there are provided means for pressing and loading the one traction run toward the carriers.

This increases the friction locking. The pressing means may, for instance, be disposed between the side wall of the guide rail and the transport apparatus which, for instance, is a conveyor belt or V-belt. The pressing means make it possible to press the V-belt or conveyor belt against the carrier with a defined force. Optimal friction conditions and thus drive conditions can thereby be established.

In accordance with yet an added feature of the invention, the spool spindles are disposed in two parallel rows, the transport apparatus is a common transport apparatus disposed between the spindle rows, and there is provided another guide rail, the guide rails being disposed opposite each other outside the spindle rows.

In accordance with yet an additional feature of the invention, there is provided a support surface, the common transport apparatus having a flat-belt-type traction mechanism slidingly guided on the support surface for further transporting and supporting the carriers of the two spindle rows from below.

In accordance with still another feature of the invention, the common transport apparatus has a flat-belt, toothed-belt or V-belt-type traction mechanism with traction runs, one of the traction runs driving the carriers of one spindle row in one direction and the other of the traction runs driving the carriers of the other spindle row in the opposite direction.

In accordance with a concomitant feature of the invention, the guide rails have intersections or branches and shunts for directing the carriers, and optionally the guide rails have openings formed therein through which the spindle bearings pass.

The guide rails may have a simple structure. Two L-shaped guides or two C-shaped guides may be located in mirror symmetry opposite one another with the openings thereof facing each other. The sliding surface may also be replaced by a roller track. The side wall of the guide rail guides the conveyor belt on the side where the conveyor belt rests, and the side walls on both sides guide the carrier. It would also be possible to guide the carrier by extending the carrier into the slit opening inbetween the guide rails, so that the carrier would be guided in the slit.

The sliding surface of the guide rail is advantageously located at the same level as the surface of the conveyor belt. This prevents the carrier from assuming a canted position that would cause the spindles to tip over and would load the transport system unilaterally, with the disadvantageous consequences of unilateral wear.

Among other advantages, the apparatus according to the invention makes it possible to purposefully retrieve carriers with spindles from a stream of many carriers traveling one after another. Through the use of shunts, individual carriers can be purposefully diverted and delivered, for instance, to a spooling or spinning station. Moreover, carriers with spindles can be introduced into the transport apparatus by these shunts.

While the introduction of carriers with spindles into the transport apparatus may be carried out simply by causing them to slide into it, a shunt is used when a carrier is retrieved from the transport apparatus, and a diverting lever above the transport mechanism and located behind an opening can be pivoted into the path of the carrier so as to divert it. If the diversion is at a right angle, then driven rollers or conveyor belts are suitably used above the transport apparatus, engaging the lateral surface of the carrier and directing it into an opening. The introduction of a carrier into an opening in order to divert it may also be accomplished by means of pushers disposed laterally on the guide rail, which push the carrier into the opening at the correct instant.

Other features which are considered as characteristic for the invention are set forth in the appended claims.

Although the invention is illustrated and described herein as embodied in an apparatus for transporting cops and cop tubes, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
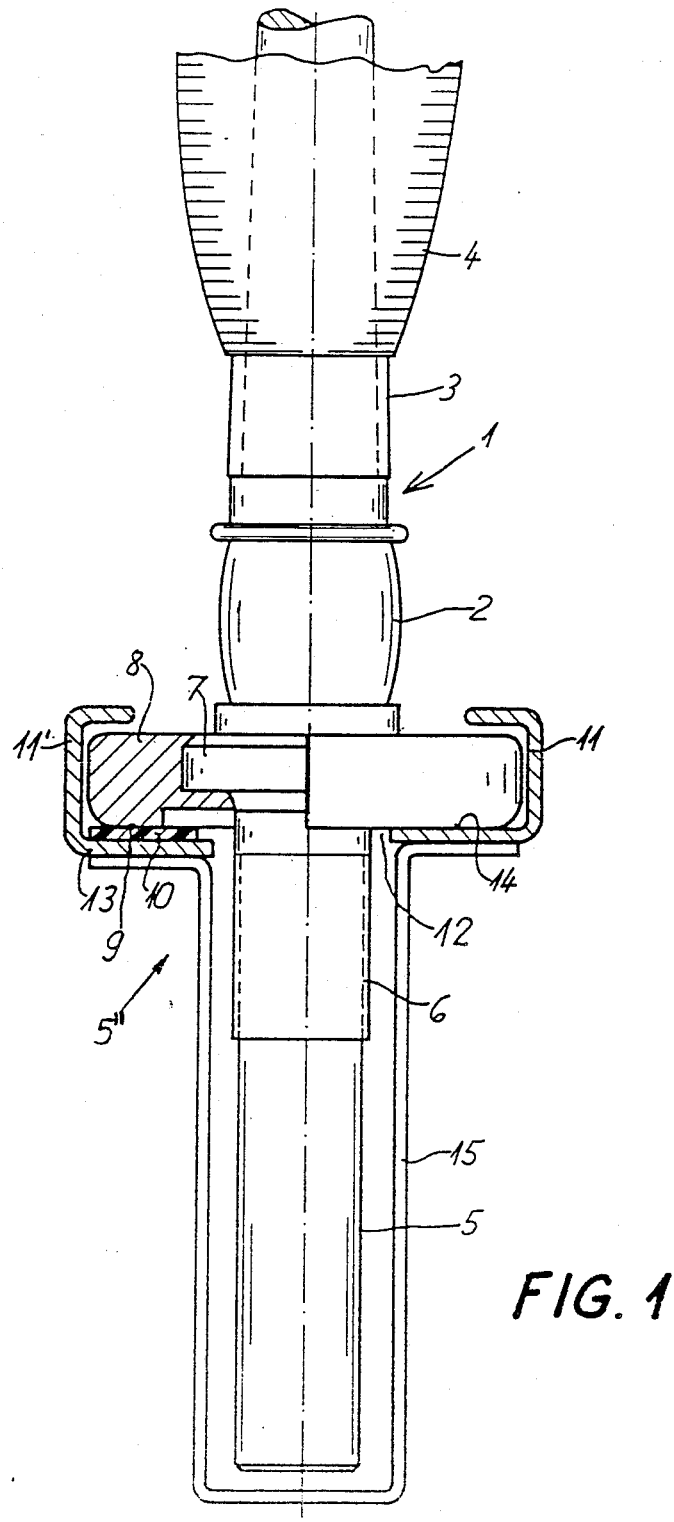
FIG. 1 is a fragmentary, diagrammatic, cross-sectional view of an apparatus according to the invention with a spindle to be transported that is carrying a cop.
Figure 2:
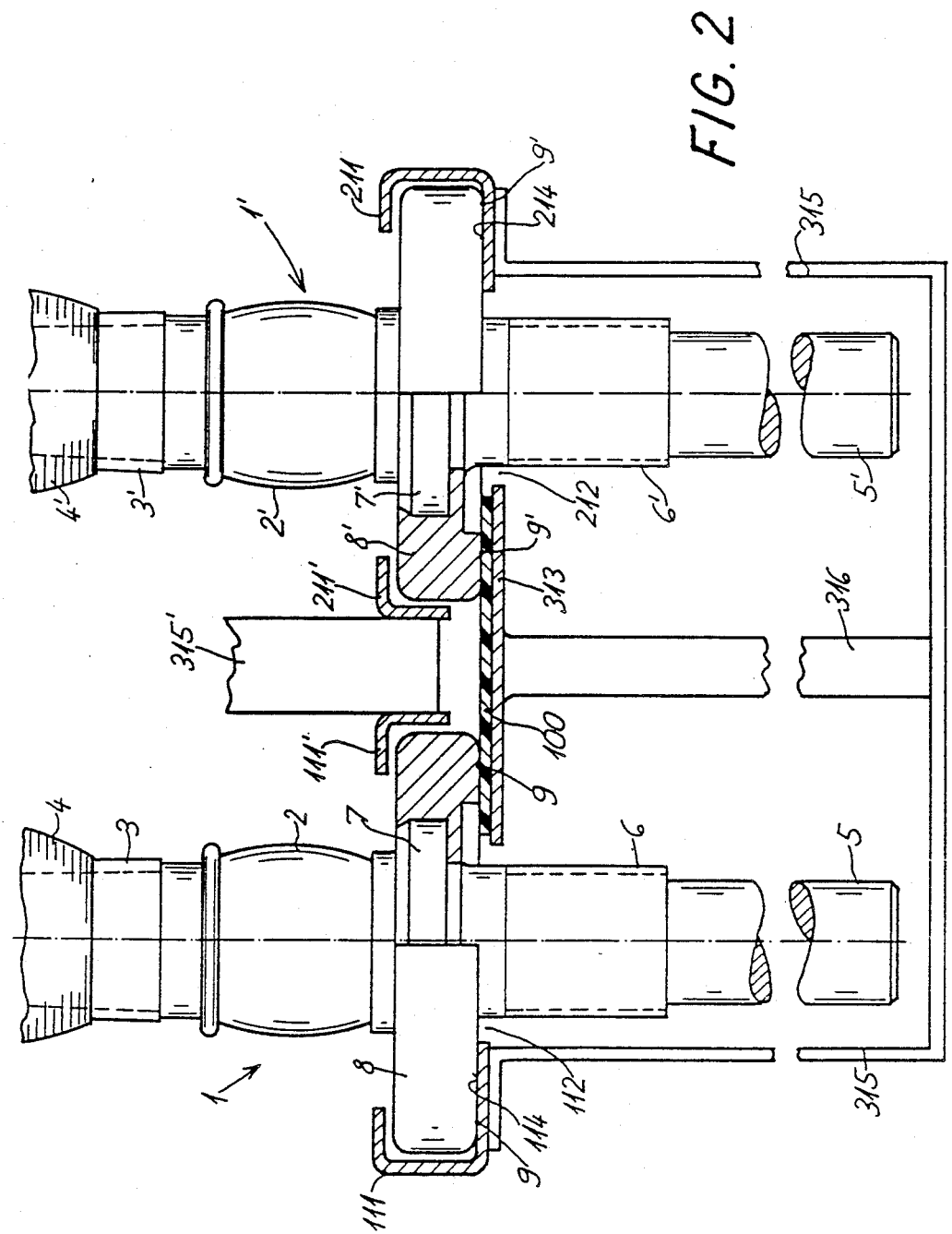
FIG. 2 is a fragmentary, cross-sectional view of two parallel spindle rows that share a conveyor belt.
Figure 3:
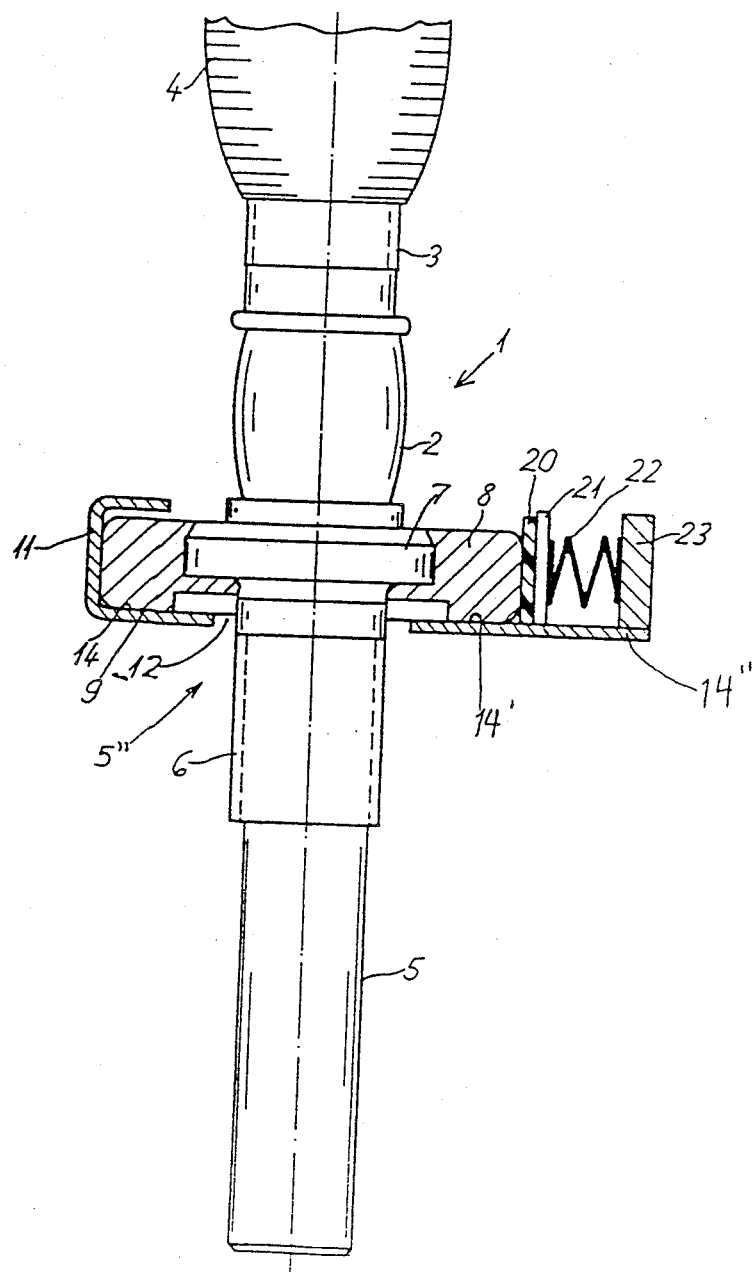
FIG. 3 is a view similar to FIG. 1 of an apparatus with a vertically guided transport mechanism.

Referring now to the figures of the drawings in detail and first, particularly, to FIGS. 1-3 thereof, it is seen that a spindle 1 of FIG. 1 as well as that of FIGS. 2 and 3 is provided with a drive element 2, in the form of a wharve, that is fixed to the spindle 1 and causes rotation thereof. A conical cop tube 3 that carries a cop 4 is placed on the spindle in friction-locking fashion.

A spindle bearing for the spindle 1, which is identified in general with reference numeral 5'', has a bearing tube 5 with a threaded portion 6, with which the spindle 1 can be inserted into the spindle rail of a spinning or twisting machine, for example, and screwed in place at that location, and it also has a collar 7. A carrier 8 that protrudes laterally beyond the spindle has been cast around and therefore fixed to the collar 7. The spindle 1 is rotatable relative to the collar 7 and the carrier 8. The carrier 8 is disk-shaped with a planar underside in the form of an annular lower surface 9. In order to demonstrate the structure of the carrier 8, one segment has been cut away in the drawing.

On the left-hand side, the annular lower surface 9 of the carrier 8 rests on the upper traction run or stringer of a transport apparatus 10, which in this case is in the form of a traction mechanism drive having flat belts.

The flat belt 10 is located in a guide rail 11'. The rail 11' and a further guide rail 11 overlap the carrier 8. The guide rails 11 and 11' have C-shaped profiles, are located in mirror symmetry to one another and are separated from one another by a slit 12. The bearing tube 5 of the spindle 1 moves through the slit 12.

On the left-hand side, the conveyor belt 10 travels on a bottom portion 13 of the guide rail 11', while on the right-hand side the planar lower surface 9 of the carrier 8 rests in the guide rail 11 on a sliding surface 14. The sliding surface 14 is located at the same level as the top of the conveyor belt 10. This prevents tipping over of the spindle 1 and unilateral deflection of the carrier 8 and thus prevents increased unilateral wear.

The C-shaped profiles of the guide rails 11 and 11' extend around the carrier 8 and thus at the same time hold it laterally and protect it from tipping out of the guide rails. In a simpler case, the guide rails may have an L-shaped profile.

If the conveyor belt 10, which has a rubber-like surface, is set into motion, the friction locking between the conveyor belt 10 and the annular lower surface 9 of the carrier 8 slaves the motion of the carrier to that of the belt. Since the frictional resistance of the annular surface 9 of the carrier 8 with respect to the sliding surface 14 is low, the carrier 8 slips over the sliding surface 14, and the spindle 1 with the cop 4 placed thereon is set into motion in the conveying direction of the conveyor belt 10 without having to rotate as well.

The guide rails 11 and 11' are joined together and kept spaced apart by U-shaped holders 15, so that the bearing tube 5 can move through the slit 12 without difficulty.

The sliding surface 14 of the guide rail 11 may be polished; however, special sliding tracks such as Teflon tracks may also be applied, or the guide rail may be in the form of a roller track.

In FIG. 2, two parallel rows of spindles 1 and 1' are shown with a common conveyor belt 100. Features of FIG. 2 which are identical to those of FIG. 1 are provided with reference numerals that indicate this identity.

As FIG. 2 shows, entirely identical spindles 1 and 1' are transported according to a further feature of the apparatus of the invention. The spindles 1 and 1' and cops 4 and 4' on tubes 3 and 3' are all identical to those of FIG. 1.

In FIG. 2, the common transport apparatus 100 of the apparatus according to the invention has a lateral guide rail 111 with a C-shaped profile for the carrier 8 and a lateral guide rail 211 with a C-shaped profile for a carrier 8'. The planar underside or lower annular surface 9 of the left-hand spindle 1 is located on a sliding surface 114 of the lateral guide rail 111, while the planar underside or lower annular surface 9' of the carrier 8' of the spindle 1' rests on a sliding surface 214 of the lateral guide rail 211. The planar undersides or lower annular surfaces 9 and 9' of the carriers 8 and 8' also rest on the common conveyor belt 100, which is supported by a common support surface 313. The support surface 313 is divided by a slit 112 from the guide rail 111 and by a slit 212 from the guide rail 211.

Lateral guidance of the carriers 8 and 8' on the common conveyor belt 100 is performed by a guide rail 111' for the row of spindles 1 and by a guide rail 211' for the row of spindles 1'. The two guide rails 111' and 211' are carried by a holder 315', which is secured in such a way that it does not hinder the functioning of the conveyor belt 100.

The guide rails 111 and 211 are carried by U-shaped holders 315, while the support surface 313 for supporting the conveyor belt 100 is held by welded-in posts 316.

The use of two parallel spindle rows with a common conveyor belt as a spindle magazine is particularly suitable for preventing bottlenecks when supplying the machines, such as if great numbers of spindles must be transported from a plurality of successive spinning or spooling machines, or if conversely they must be transported to a plurality of spinning or spooling machines.

FIG. 3 shows an apparatus according to the invention having a vertically guided transport apparatus 20. Once again, all of the elements agreeing with the foregoing figures are provided with the same reference numerals.

The spindle 1 with the cop 4 on the tube 3 is transported in the guide rail 11, the bearing tube 5 with the threaded portion 6 are located below the groove or channel and the drive wharve 2 and the cop 4 are located above the groove or channel. The collar 7 of the spindle 1 is encompassed by a disk-type carrier 8.

The left-hand side of FIG. 3 shows the guide rail 11 having a C-shaped profile with the sliding surface 14 on which the annular lower surface 9 of the planar underside of the carrier 8 slides. The right-hand side of FIG. 3 shows that the annular lower surface 9 of the planar underside of the carrier 8 also slides on a sliding surface 14' of a guide rail 14''. The transport apparatus or conveyor belt 20 rests on the lateral or side surface of the carrier 8 and is pressed against this lateral surface by pressing means which in this case are in the form of a sliding runner 21. The pressing is effected by springs 22, which are supported against a wall 23. If the conveyor belt 20 is pulled, it carries the carrier 8 along with it because of the friction-locking engagement with the carrier, so that the carrier rolls on the guide rail 11. The annular lower surface 9 of the carrier 8 slides on the sliding surface 14 and 14'. The pressing force of the sliding runner 21 can be adjusted in a known manner by adjusting the tension of the springs 22.

This embodiment according to the invention makes it possible to guide the carriers 8 on curved paths or in closed loop paths, which the curves extending toward the side on which the conveyor belt is located.

Figure 4:
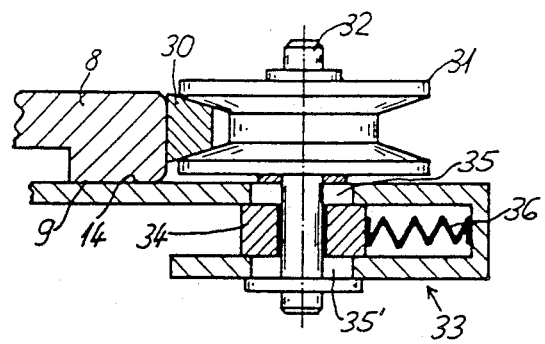
FIG. 4 is a fragmentary, cross-sectional view of an apparatus with a V-belt having a pressing roller as the transport apparatus.

Instead of a flat conveyor belt, a V-belt or toothed belt can be used for transporting a carrier. One such possibility is shown in FIG. 4. Like the conveyor belt 20 of FIG. 3, a V-belt 30 is pressed laterally against the carrier 8. FIG. 4 shows in detail how the belt 30 is pressed by a pressing roller 31 against the lateral surface of the carrier 8. A shaft 32 of the pressing roller 31 is supported in a guide 33 for a sliding block 34, below the sliding surface 14 on which the annular lower surface 9 of the underside of the carrier 8 slides. The shaft 32 is guided in longitudinal grooves 35 and 35' in the guide 33 transversely to the course of the belt 30, and the sliding block 34 seated in the guide 33 is pressed toward the carrier 8 by a spring 36, so that the belt 30 rests firmly against the lateral surface of the carrier 8 by means of the pressing roller 31. The pressing roller is constructed in such a way that the V-belt 30 protrudes out beyond the peripheral surface thereof.

Transporting the carriers 8 with a V-belt or toothed belt also permits guidance of the carrier on a path having a curvature which extends, for instance, toward the side on which the V-belt or toothed belt is located. An endless V-belt or toothed belt also makes it possible to transport the carriers in a closed loop.

Figure 5:
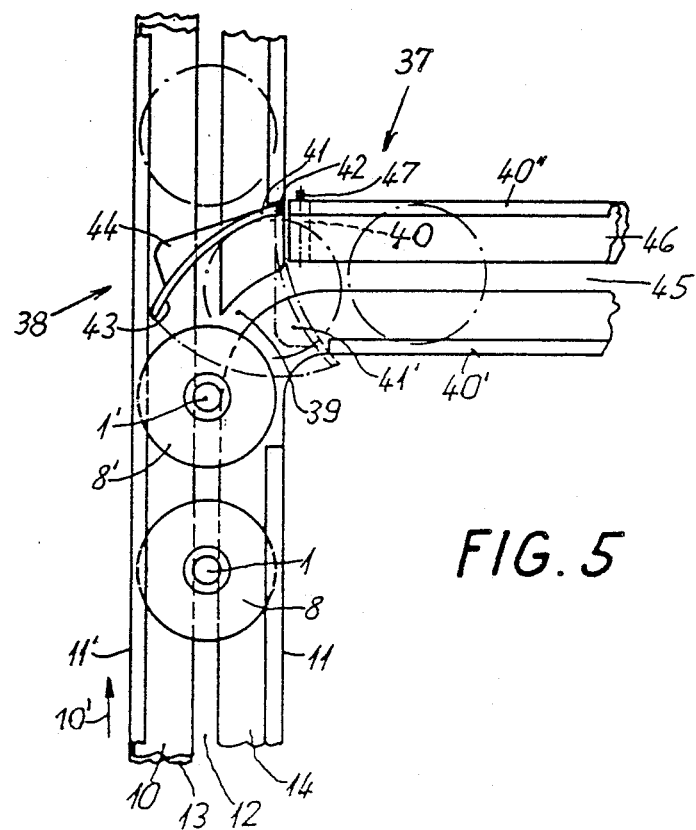
FIG. 5 is a fragmentary, plan view of open work for the purposeful diversion of carriers at a branch.

FIG. 5 shows how a carrier can be diverted. In order to introduce a carrier into the guide rail, it is sufficient to use a simple delivery chute in the form of a slit channel, which introduces the carrier from the side through an opening in the guide rail on which no conveyor belt is resting. However, in order to divert a carrier which is not to move downward by gravity on an inclined path, a transport mechanism must be provided in the branch.

According to FIG. 5, the lateral guide rails 11 and 11' are separated from one another by a slit 12. The conveyor belt 10 runs on the bottom 13 of the guide rail 11'.

The conveyor belt transports a spindle 1 on a carrier 8 and a spindle 1' on a carrier 8'.

The carrier 8' having the spindle 1' is to be diverted through an opening 39 in the guide rail 11' and the sliding surface 14 onto a branch 37. To this end, a pivotable diverting lever 41 which is part of a shunt 38 and is disposed laterally alongside the guide rail 11, is pivoted about a shaft 42 behind the opening 39 toward the guide rail 11'. A surface 43 of the diverting lever 41 which is oriented toward the carrier 8', is curved in such a way that the carrier 8' rolls on it and is diverted into the branch 37, whereupon the spindle 1' with its bearing tube slides into a slit 45 between two guide rails 40', 40".

The guidance of the carrier 8' in the branch 37 is performed by the lateral guide rails 40' and 40", which have C-shaped profiles. Extending along the bottom of the guide rail 40" is a conveyor belt 46, which performs the task of transporting away the carrier 8'. The conveyor belt 46 is guided at the beginning of the branch 37 over a deflecting roller 40, having a shaft 47 which protrudes laterally out of the guide rail 40".

In a rest position, the lever 41 is pivoted into a position 41' shown in phantom, so that the carriers can roll on a rear surface 44 thereof, which is formed along a straight line. In the rest position 41' of the diverting lever 41, the rear surface 44 forms guidance means for the carriers.

The embodiment shown in FIG. 5 is only one possibility for enabling transfer of the carrier from one transport apparatus to another. It is also possible for pushers attached laterally beside the guide rail to push the carriers 8 through an opening 39 into a lateral branch at the correct instant. Another possible option is to divert carriers by means of gravity, by briefly lowering a portion of a guide rail with a carrier resting on it to the side at the location of the opening, after which the carrier is to be removed. Then the carrier can be transferred through a slightly inclined chute onto another transport apparatus which, for example, may also extend parallel to the first transport apparatus.

Figure 3A:
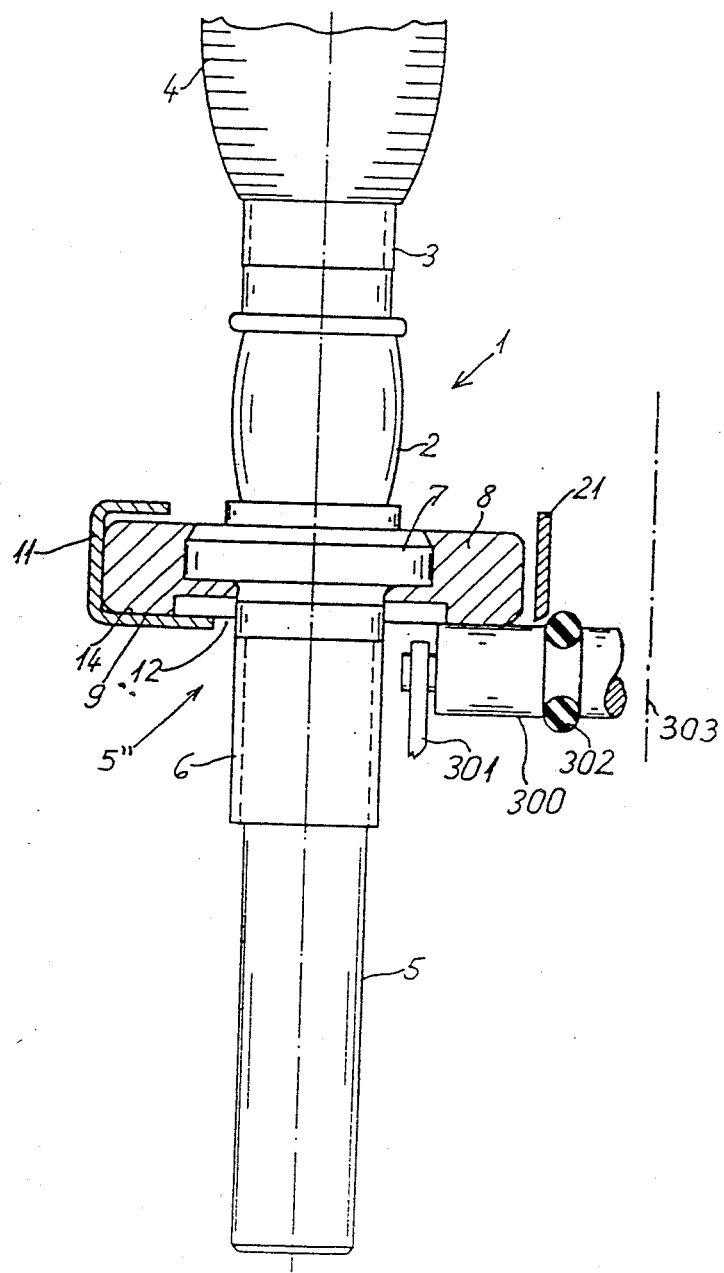
FIG. 3A is a view similar to FIG. 3 of an apparatus with a transport mechanism having driven rollers.

FIG. 3A shows a further embodiment of the invention as well.

Instead of a conveyor belt 20, a transport apparatus 300 may be formed of a configuration of driven rollers which, for instance, are supported in carriers 301 and are driven by means of a cord 302 or a chain.

A second row of spindles may be present, in mirror symmetrical with respect to a central plane 303. In such a case, the rollers 300 could be long enough to serve as a drive apparatus for both spindle rows.

Alternatively, the returning traction run or stringer of the drive belt 20 which is not shown in FIG. 3, could drive the second spindle row, so that one spindle row can be driven in one direction and the other spindle row in the opposite direction with one and the same drive belt. In this case, there would thus be only one guide rail 14" for both spindle rows.

We claim:

1. Apparatus for transporting cops and cop tubes, comprising a plurality of circular-disk-type carriers, each of said carriers having an upper and a lower planar surface, a spindle bearing assembly having a bearing portion penetrating the upper and the lower surfaces and protruding beyond the lower surface, a spool spindle being rotatably supported on said bearing assembly and protruding beyond the upper surface for carrying a cop or a tube, a transport apparatus movable in a given transport direction having a surface operatively engaging said carrier, and guide means for slidingly guiding the lower surface of said carrier, said guide means having an opening formed therein through which said bearing portion passes.

2. Apparatus according to claim 1, wherein said transport apparatus is in the form of a configuration of driven rollers.

3. Apparatus according to claim 1, wherein said transport apparatus is in the form of a traction mechanism drive.

4. Apparatus according to claim 1, wherein said guide means includes a first and a second guide rail, said second guide rail being disposed opposite said first guide rail, said transport apparatus being disposed in said second guide rail.

5. Apparatus according to claim 4, wherein said transport apparatus includes a flat-belt-type traction mechanism sliding on said second guide rail between said second guide rail and said lower surface of said carrier.

6. Apparatus according to claim 1, wherein said transport apparatus has a flat-belt-type traction mechanism with a traction run, said traction run laterally contacting the periphery of said circular-disk-type carrier.

7. Apparatus according to claim 1, wherein said transport apparatus has a toothed-belt-type traction mechanism with a traction run, said traction run laterally contacting the periphery of said circular-disk-type carrier.

8. Apparatus according to claim 1, wherein said transport apparatus has a V-belt-type traction mechanism with a traction run, said traction run laterally contacting the periphery of said circular-disk-type carrier.

9. Apparatus according to claim 6, including means for pressing said traction run toward said carrier.

10. Apparatus according to claim 7, including means for pressing said traction run toward said carrier.

11. Apparatus according to claim 8, including means for pressing said traction run toward said carrier.

12. Apparatus according to claim 1, wherein said spool spindles are disposed in two parallel rows, and said transport apparatus is a common transport apparatus disposed between said spindle rows, said guide means including guide rails being disposed opposite each other outside said spindle rows.

13. Apparatus according to claim 12, including a support surface, said common transport apparatus having a flat-belt-type traction mechanism slidingly guided on said support surface for further transporting and supporting said carriers of said two spindle rows from below.

14. Apparatus according to claim 1, wherein said guide means has intersections or branches and shunts for directing said carriers.

* * * * *